Nov. 10, 1925.
C. GLIDRIC ET AL
1,561,320
WINDSHIELD WIPER
Filed June 20, 1925
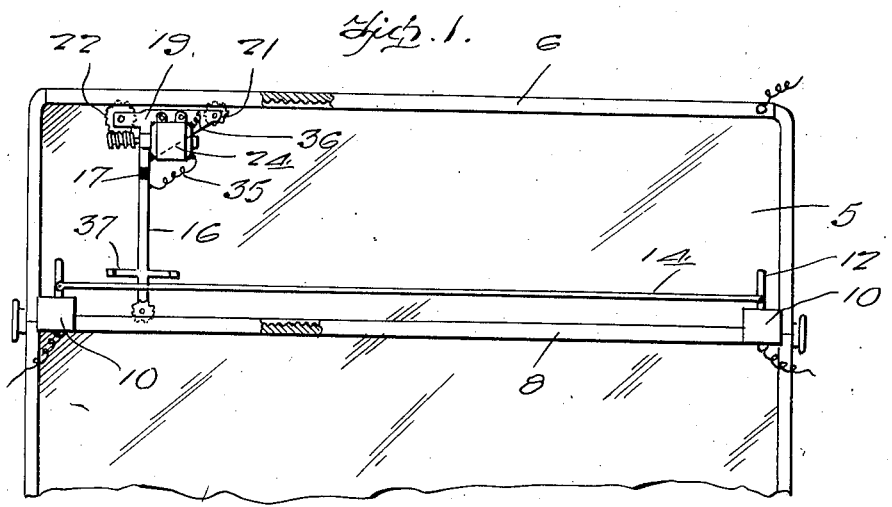
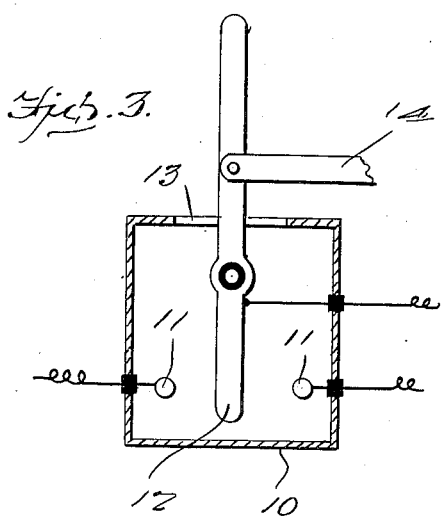
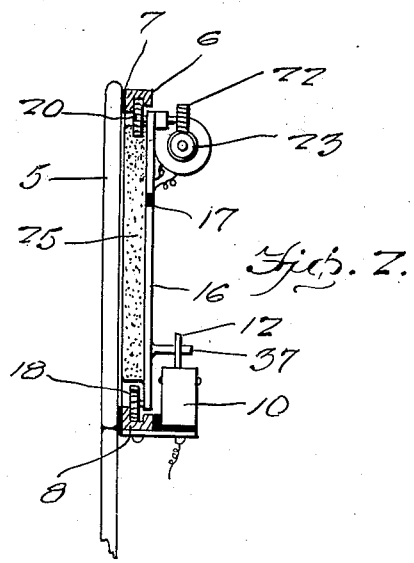
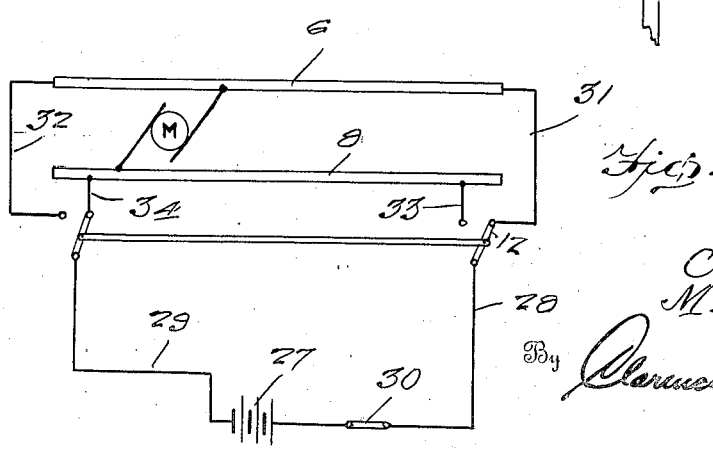
Inventors
C. Glidric
M. Bates
By Clarence A. O'Brien
Attorney Patented Nov. 10, 1925.

1,561,320

UNITED STATES PATENT OFFICE.

CHARLES GLIDRIC AND MALVIN BATES, OF MEMPHIS, TENNESSEE.

WINDSHIELD WIPER.

Application filed June 20, 1925. Serial No. 38,491.

*To all whom it may concern:*

Be it known that we, CHARLES GLIDRIC and MALVIN BATES, both citizens of the United States, residing at Memphis, in the county of Shelby and State of Tennessee, have invented certain new and useful Improvements in a Windshield Wiper, of which the following is a specification.

The present invention relates to a cleaning device and more particularly to a windshield wiper.

An object of the invention is to provide a new and improved windshield wiper of simple construction which will prove thoroughly effective, and reliable in operation, and forms a permanent part of the windshield and is operable to move back and forth the motor for driving the same being automatically reversed.

Another important object of the invention is to provide a windshield wiper of this nature which requires very little if any attention on the part of the operator of the vehicle, one which will prove durable, not likely to easily become out of order, and otherwise well adapted to the purpose for which it is designed.

With the foregoing and numerous other objects in view as will appear as the description proceeds, the invention resides in certain novel features of construction, and in the combination and arrangement of parts as will be hereinafter more fully described and claimed.

In the drawing—

Figure 1 is a front elevation of a windshield showing our wiper associated therewith, Fig. 2 is a sectional view through the racks and showing the wiper in side elevation, Fig. 3 is a sectional view through one of the switch boxes, and Fig. 4 is a diagrammatic view showing the circuits incident to the control of the wiper.

Referring to the drawing in detail it will be seen that an ordinary windshield is indicated at 5. A channeled rack 6 is attached to the upper portion of the windshield to extend horizontally and is insulated therefrom as is indicated at 7. Another rack 8 is mounted on the windshield in parallel spaced relation below the rack 6. The rack 8 is insulated from the windshield as is indicated at 9.

A switch box 10 is mounted at each end of the rack 8 and has therein a pair of spaced contacts 11 which are engageable by one end of a pivoted arm 12 extending upwardly through an opening 13 provided in the housing 10. The two arms operate together through the connecting rod 14 which has its ends pivotally attached to the arm 12.

A carriage is movable between the racks 6 and 8 and includes a bar 16 which has its lower portion insulated from its upper portion as at 17. A toothed wheel 18 is journaled on the lower end of the bar 16 while a bracket 19 is provided on the upper end thereof and has journaled thereon a drive wheel 20 and an idler wheel 21. The drive wheel 20 is on the same shaft with a worm wheel 22 which meshes with a worm 23 carried by a shaft of a motor 24 fixed to the bracket 19. The toothed wheels 20 and 21 cooperate with the channeled rack 6 while the toothed wheel 18 cooperates with the rack 8.

It will thus be seen that when the motor 24 is energized that the carriage will move transversely of the windshield. A wiping element 25 is carried by the carriage for engaging the adjacent surface of the windshield for cleaning the same in the usual well known manner.

Referring now particularly to the wiring diagram in Fig. 4, it will be seen that a source of electrical energy 27 in the form of a battery or the like has one pole connected to one switch arm 12 by a wire 28 and the other pole connected to the other switch arm 12 by a wire 29. A switch 30 is interposed in the wire 28. The outer contacts 11 of the two switches 10 are connected to the upper rack 6 by wires 31 and 32 respectively, while the inner contacts are connected to the lower rack by wires 33 and 34 respectively. The lower portion of the carriage is electrically connected to one pole of the motor 24 by wire 35 while the other pole of the motor is connected to the upper portion of the carriage by wire 36. The lower portion of the carriage is provided with projections 37 for engaging the switch arms 12.

As shown in the drawings, particularly Figs. 1 and 4, it will be seen that if the switch 30 is closed and the switch arms 12 are rocked to the left (Fig. 1) the current will flow from the source of electrical energy 27 through wire 28, through the switch to the right, through wire 31, through rack 6, through the upper portion of the carriage, through wire 36, through the motor 24, and returned through wire 35, through the lower portion of the carriage, through rack 8, through wire 34, through switch to the left, and wire 29. This will cause the energization of the motor so as to drive the wheel 18 thus moving the carriage to the right. When the carriage reaches the right hand side of the windshield, one of the projections 37 will engage the right hand switch arm 12 and throw the switches so as to reverse the flow of the current through the motor 24 as will be obvious thereby reversing the motor and causing the carriage to travel back. Thus this carriage will travel back and forth as long as the switch 30 is closed.

It is thought that the construction, operation, and advantages of the invention will now be clearly understood by those skilled in this art without a more detailed description thereof. It is desired, however, to point out that such changes in the details of construction, and in the combination and arrangement of parts may be resorted to as do not depart from the spirit or scope of the invention as hereinafter claimed.

Having thus described our invention, what we claim as new is:—

1. A windshield cleaner including a pair of racks mounted on the windshield in spaced parallel relation and insulated therefrom, a switch at each end of the lower rack, each switch having a pair of fixed terminals and a movable arm, one terminal of each switch being electrically connected with one rack and the other terminal electrically connected with the other rack, a connecting rod between the arms of the switches, a carriage, pinions on the carriage travelable on the racks, a motor on the carriage operatively associated with one of the pinions for driving the carriage, the lower portion of the carriage being insulated from the upper portion of the carriage, the lower portion of the carriage being electrically connected with one pole of the motor and the upper portion being electrically connected with the other pole thereof.

2. A windshield cleaner including a pair of racks adapted to be mounted on a windshield in spaced parallel relation to each other and insulated from the windshield, a carriage movably mounted between the racks, a motor carried by the carriage, said racks forming electric conductors for the motor, means associated with the racks for alternately energizing the motor in different directions to reverse its operativeness, means associated with the motor, the carriage and the racks for driving the carriage back and forth between the racks, and a wiping element for the windshield mounted on the carriage.

In testimony whereof we affix our signatures.

CHARLES GLIDRIC.
MALVIN BATES